United States Patent [19]

Takagi et al.

[11] Patent Number: 4,770,105
[45] Date of Patent: Sep. 13, 1988

[54] PIPING TRAVELLING APPARATUS

[75] Inventors: Atsushi Takagi, Tokyo; Shinichi Kurita, Hitachi; Seishi Watahiki, Katsuta; Yasuzi Sakuma, Hitachi; Kiyoshi Sakamoto, Hitachi; Chikara Sato, Hitachi, all of Japan

[73] Assignees: Hitachi, Ltd.; Tokyo Gas Co., Ltd., both of Japan

[21] Appl. No.: 892,285

[22] Filed: Aug. 4, 1986

[30] Foreign Application Priority Data

Aug. 7, 1985 [JP] Japan .................. 60-172339

[51] Int. Cl.$^4$ .......................................... G01M 19/00
[52] U.S. Cl. .................. 104/138.2; 73/866.5
[58] Field of Search .............. 104/138.2; 73/866.5, 73/865.8; 175/73, 76, 94

[56] References Cited

U.S. PATENT DOCUMENTS

| | | | |
|---|---|---|---|
| 2,515,953 | 7/1950 | Dufresne | 104/138.2 X |
| 3,563,954 | 2/1971 | Okada et al. | 104/138.2 |
| 3,718,978 | 7/1973 | Van Koevering et al. | 104/138.2 X |
| 3,872,940 | 3/1975 | Gambini | 104/138.2 X |
| 3,881,776 | 5/1975 | Fashbaugh et al. | 175/94 X |
| 3,903,974 | 9/1975 | Cullen | 175/73 X |
| 4,085,808 | 4/1978 | Kling | 175/94 X |
| 4,112,850 | 9/1978 | Siegel-Gfeller | 104/138.2 |
| 4,218,923 | 8/1980 | Triplett et al. | 73/623 |
| 4,457,236 | 7/1984 | Akmadieu et al. | 104/138.2 |
| 4,601,204 | 7/1986 | Fournot et al. | 104/138.2 X |

FOREIGN PATENT DOCUMENTS

| | | | |
|---|---|---|---|
| 2733199 | 2/1979 | Fed. Rep. of Germany . | |
| 107058 | 9/1978 | Japan . | |
| 123991 | 10/1978 | Japan . | |
| 757431 | 8/1980 | U.S.S.R. | 104/138.2 |

Primary Examiner—Tom Noland
Attorney, Agent, or Firm—Antonelli, Terry & Wands

[57] ABSTRACT

A piping travelling apparatus having a plurality of continuous treads driven by motors through transmission gearing. The continuous treads are mounted to a frame and spaced apart a predetermined distance peripherally of the inner wall surface of the piping. At least one of the continuous treads is kept in contact with the inner wall surface of the piping no matter what the posture of the apparatus may be, so that the apparatus can travel without any trouble even if its posture undergoes a change when it moves along elevations and depressions on the inner wall surface of the piping or negotiates the boundary between different levels of the inner wall surface or bends of the piping. The apparatus enables a travel through piping of relatively small diameter having vertical or steeply slanted pipes to be made without any trouble.

3 Claims, 7 Drawing Sheets

PIPING TRAVELLING APPARATUS

BACKGROUND OF THE INVENTION (1) Field of the Invention

This invention relates to a piping travelling apparatus, and more particularly it is concerned with a piping travelling apparatus suitable for use in travelling through piping of relatively small diameter, such as gas distribution pipes, which has different levels in wall surface at pipe joints and elevations and depressions at many locations and which includes vertical or slanted pipe elements.

(2) Description of the Prior Art

Various proposals have hitherto been made to use different piping travelling apparatus to carry out maintenance and inspection inside the piping. One type of such apparatus is disclosed in Japanese Patent Unexamined Publication No. 107058/78 as a self-propelled vehicle having articulated arms. Another type is disclosed in Japanese Patent Unexamined Publication No. 123991/78 as a piping moving apparatus.

The self-propelled vehicle having articulated arms is capable of travelling while overcoming by its articulated arms any obstacle that might lie in the path of its travel can travel through not only piping but also a narrow space forming a multiple layer structure. The piping moving apparatus is intended for use in carrying out maintenance and inspection from inside heat transfer pipes of a nuclear power plant, for example, by inserting a probe for detecting flaws in the piping. The problem encountered in these systems of the prior art is that, although they are constructed to accommodate small variations in pipe diameter and negotiate gentle bends in piping, they lack the ability to travel along wavy surfaces and surfaces having changes in level and to negotiate sharp bends, so that they are unable to alter the direction of their travel by following a sharp bend or a branch at a junction. Thus, when they are used for travelling through gas distribution pipes including pipes of a T-shape or piping of small diameters having elbows bent at right angles, they would be unable to travel smoothly because moving means and tensioning means might drop into gaps in the pipe joints or catch against wall surfaces at the junctions.

SUMMARY OF THE INVENTION (1) Object of the Invention

This invention has been developed for the purpose of obviating the aforesaid disadvantage of the prior art. Accordingly, the invention has as its object the provision of a piping travelling apparatus which has no difficulties in travelling through piping of relatively small diameter having elevations and depressions and changes in the level of its inner wall surface and including vertical or slanted pipes.

(2) Statement of the Invention

To accomplish the aforesaid object, the invention provides a piping travelling apparatus comprising a vehicle equipped with a plurality of continuous treads spaced apart peripherally of the inner wall surface of the piping, and drive motor means in the vehicle for driving the continuous treads to enable the vehicle to travel through the piping along the inner wall surface thereof. The vehicle may be equipped with continuous tread biasing means allowing the plurality of continuous treads to follow the inner wall surface of the piping peripherally thereof while forcing the continuous treads against the inner wall surface of the piping with a force of arbitrarily selected magnitude.

DESCRIPTION OF THE PREFERRED EMBODIMENTS

Preferred embodiments of the invention will now be described by referring to the accompanying drawings.

Figure 1:
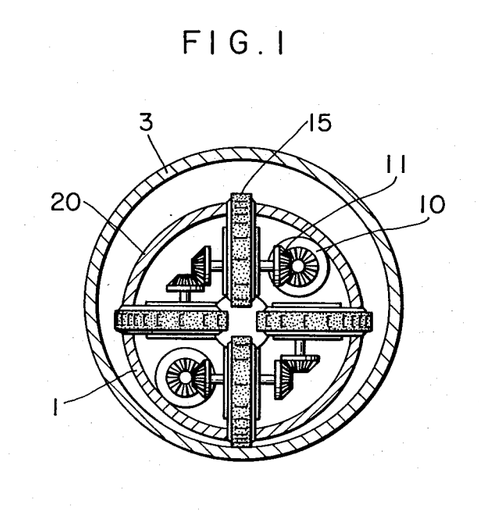
FIG. 1 is a sectional view of one emdodiment of the piping travelling apparatus in conformity with the invention, as shown in the direction of travel of the vehicle.
Figure 2:
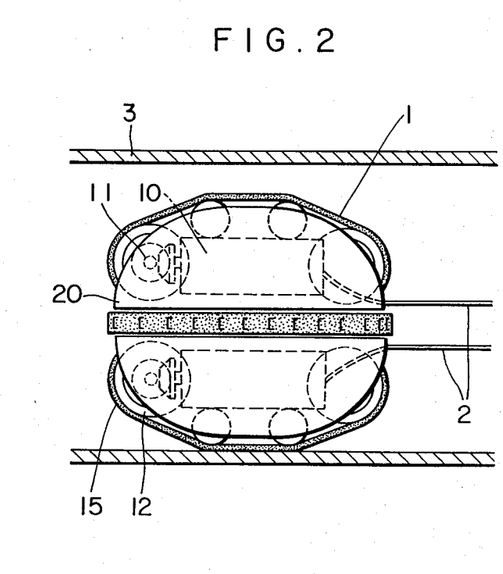
FIG. 2 is a front view of the system shown in FIG. 1.

FIGS. 1 and 2 show one embodiment of the invention, in which the piping travelling apparatus comprises at least one vehicle 1 having a frame 20, a plurality of continuous treads 15 mounted to the frame 20 and a plurality of drive motors 10 in the frame 20 for driving the continuous treads 15. The drive motors 10 serving as a source of motive force transmit motive force through transmission gearing 11 to drive wheels 12 of the continuous treads 15. The vehicle 1 travels through piping 3 along an inner wall surface thereof as the continuous treads 15 are driven by the drive wheels 12. Thus it is necessary when the vehicle 1 travels that at least one of the continuous treads 15 be maintained in contact with the inner wall surface of the piping 3, no matter what the posture of the vehicle 1 may be. When there are changes in the level of the inner wall surface of the piping 3 or when the piping 3 has joints which are bent, the posture of the vehicle 1 undergoes changes. In such case, it is particularly necessary that the vehicle 1 can negotiate the boundary between different levels on the inner wall surface of the piping 3 by the function of the continuous treads 15, no matter what the posture of the vehicle 1 may be. To this end, the continuous treads 15 are located on the periphery of the frame 20 in four positions and spaced apart a predetermined distance peripherally of the inner wall surface of the piping 3. This arrangement enables the vehicle 1 to smoothly negotiate the boundary between different levels on the inner wall surface of the piping 3 by the function of the continuous treads 15. The frame 20 which contains the drive unit for the continuous treads 15 avoids damage to the drive unit which might otherwise occur when the vehicle 1 collides with obstacles inside the piping 3 and prevents entry of foreign matter, such as dust or grit, from the piping 3 into the vehicle 1.

In the embodiment of the invention constructed as shown in FIGS. 1 and 2 and described hereinabove, at least one of the continuous treads 15 is kept in contact with the inner wall surface of the piping 3, no matter what the posture of the vehicle 1 may be during its travel through the piping 3. Thus the system for travelling through the piping 3 according to the invention can continue operation without any trouble even if the posture of the vehicle is affected by the physical conditions inside the piping 3, such as a rise and a fall, a change in the level or curving on the inner wall surface of the piping 3, because at least one of the continuous treads 15 is kept in contact with the inner wall surface of the piping 3 at all times during the travel of the vehicle 1 through the piping 3.

Figure 3:
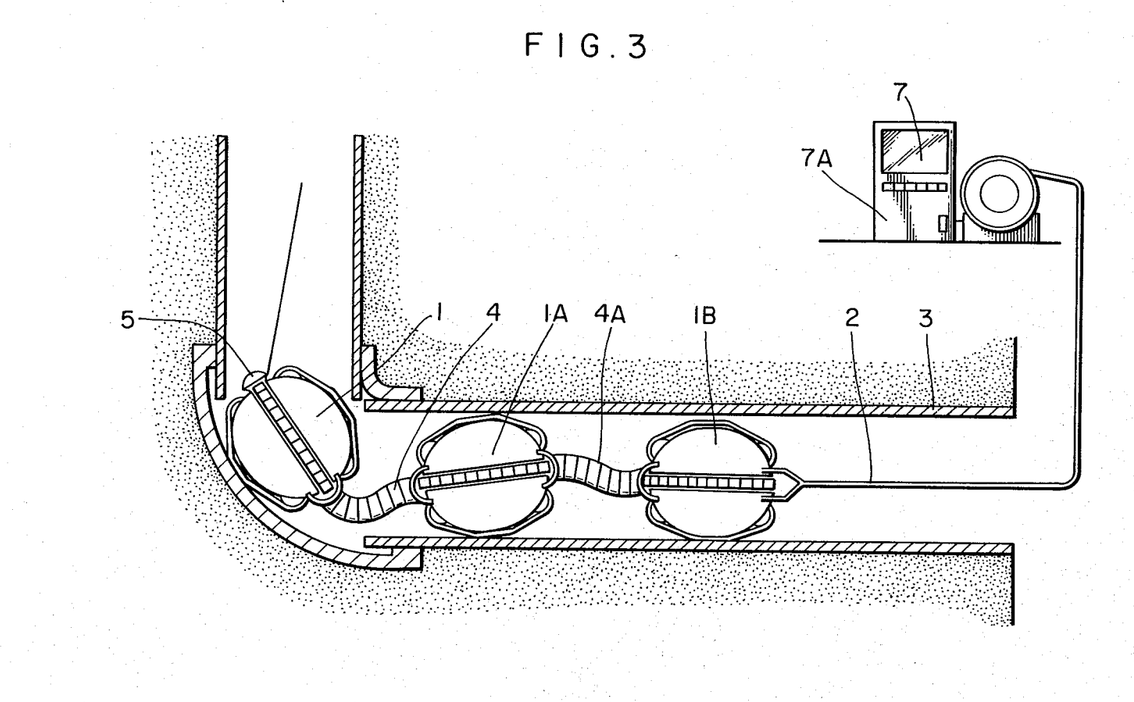
FIG. 3 is a front view of another embodiment of the piping travelling apparatus in conformity with the invention which comprises a plurality of vehicles coupled together by coupling frames, and sensor means to prc,vide a moving system for inspecting the inside of the piping.
Figure 4:
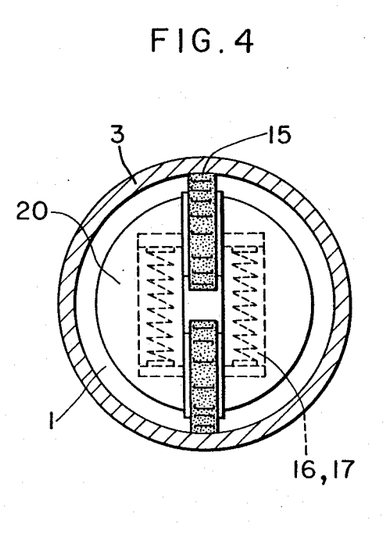
FIG. 4 is a sectional view of another embodiment of the piping travelling apparatus in conformity with the invention equipped with one constructional form of continuous tread biasing means comprising resilient members, showing the continuous treads in an extended position.
Figure 5:
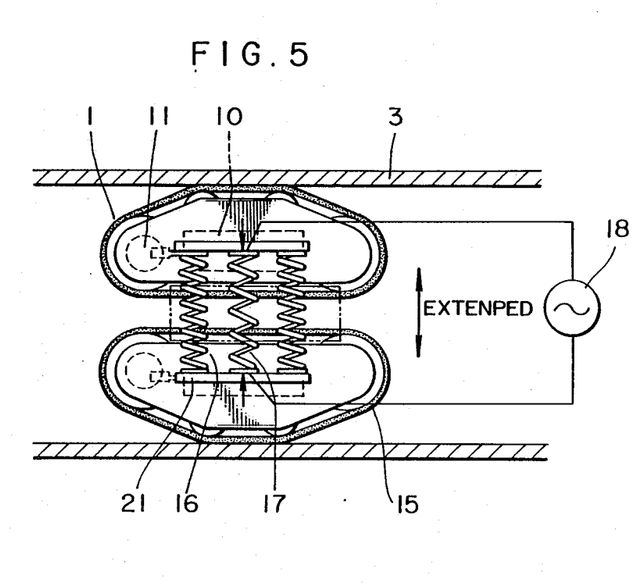
FIG. 5 is a front view of the system shown in FIG. 4.
Figure 6:
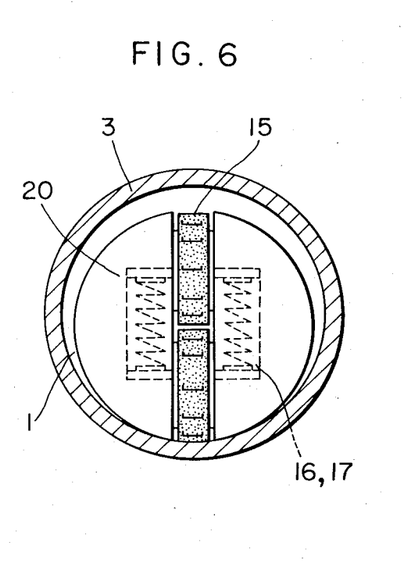
FIG. 6 is a sectional view similar to FIG. 4 but showing the continuous treads in a retracted position.
Figure 7:
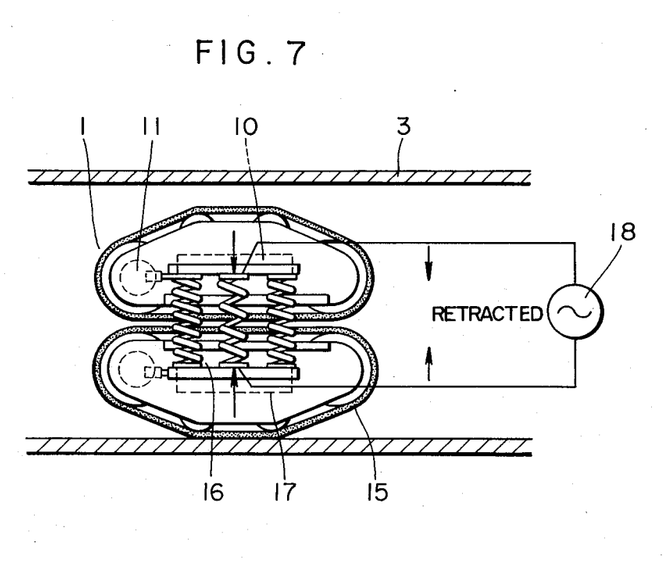
FIG. 7 is a front view of the system shown in FIG. 6.

FIG. 3 shows another embodiment of the invention, in which a plurality of vehicles are coupled together and sensor means for sensing the conditions in the piping 3 is mounted to provide a moving system for inspecting the inside of the piping 3.

In FIG. 3, the plurality of vehicles are coupled together by means of coupling frames. The coupling frames used in this embodiment may be of any form as desired, such as flexible joints, universal joints, etc. As sensor means, an objective lens 5 is mounted at a forward end of the leading vehicle 1 to enable the conditions to be inspected by means of optical fibers. The objective lens 5 may be replaced by a fixed camera, flaw detector or any other suitable means. A leading vehicle 1 and an intermediate vehicle 1A and the intermediate vehicle 1A and a trailing vehicle 1B are coupled together through coupling frames 4 and 4A, respectively, which may be flexible joints or universal joints as described hereinabove. The sensor means is connected to a control board 7A installed on the ground through a cable 2 for transmitting signals and supplying power. The operator drives the train of vehicles 1, 1A and 1B through the control panel 7A while monitoring the conditions in the piping 3 by watching a television screen 7 on the ground. When the piping 3 has elbow joints bent at right angles, it is necessary that each vehicle have a total length great enough to negotiate the bend of each elbow joint. When the train of vehicles has a long distance to travel through the piping 3 and the resistance offered by the cable 2 which is being pulled along the path of movement of the vehicles increases, necessary traction force is produced by the plurality of vehicles forming a train of vehicles.

Another embodiment of the invention comprising continuous tread biasing means mounted in the vehicle shown in FIGS. 1 and 2 for biasing the continuous treads 15 into contact with the inner wall surface of the piping 3 with a force of arbitrarily selected magnitude will be described by referring to FIGS. 4–7.

FIGS. 4–7 show one constructional form of continuous tread biasing means of the piping travelling apparatus according to the invention which comprises coil springs 16 for biasing the continuous treads 15 into contact with the inner wall surface of the piping 3, a spring holder 21 for supporting the coil springs 16 and securing same to the frame 20 of the vehicle 1 and coil springs 17 formed of shape memory alloy for controlling the biasing force of the coil springs 16. The provision of the continuous tread biasing means of this construction enables the continuous treads 15 which drive the vehicle 1 to be kept in contact with the inner wall surface of the piping 3 at all times when the vehicle 1 moves upwardly along inner wall surfaces of pipe elements which are vertical or slanted with respect to the horizontal, so that a frictional drag necessary to keep the vehicle 1 in position on the inner wall surface of the piping 3 can be produced. As a result, the continuous treads 15 do not slip when moving along wall surfaces of vertical pipe elements or steeply slanted pipe elements and enable the vehicle 1 to produce a traction force of high magnitude. The traction force produced by the vehicle 1 is proportional to the biasing force of the coil springs 16. Thus the coil springs 16 preferably produce a high biasing force when the vehicle 1 is required to produce a high traction force as when the vehicle 1 has a flaw detector or a fiber-scope attached thereto during its travel. However, when the vehicle 1 shifts from one level to another on the inner wall surface of the piping 3, the high biasing force of the coil springs 16 needs to be reduced because, if the biasing force of the coil springs 16 is high, the traction force of the vehicle 1 necessary for moving from one level to another is high. To this end, the coil springs 17 formed of shape memory alloy are heated by heating means 18 when the vehicle 1 shifts from one level to another, so as to reduce the biasing force of the coil springs 16 or withdraw the continuous treads 15 fully into the frame 20 of the vehicle 1.

In the embodiment of the invention shown and described hereinabove, it is possible to force the continuous treads 15 against the inner wall surface of the piping 3 with a force of desired magnitude. This enables the vehicle 1 to produce a force of propulsion or a traction force sufficiently high to allow the vehicle 1 to travel without any trouble through the piping 3 having different levels on the inner wall surface or including pipe elements which are vertical or steeply slanted with respect to the horizontal. The arrangement whereby the continuous treads 15 can be fully withdrawn into the frame 20 of the vehicle 1 enables the vehicle 1 to be removed from inside the piping 3 when it is impossible for the vehicle 1 to travel through the piping 3 due to the presence of foreign matter in the piping 3.

Figure 8:
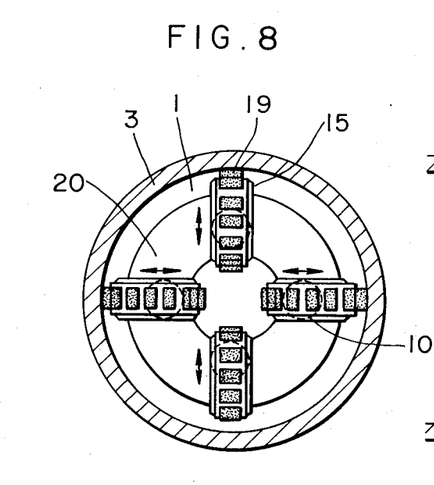
FIG. 8 is a sectional view of a modification of the embodiment shown in FIG. 4 which is equipped with another constructional form of continuous tread biasing means comprising magnets.
Figure 9:
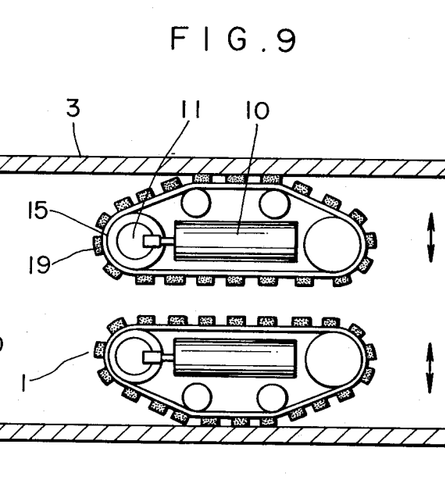
FIG. 9 is a front view of the system shown in FIG. 8.

FIGS. 8 and 9 shows another constructional form of continuous tread biasing means comprising magnets.

More specifically, the continuous tread biasing means comprises a plurality of magnets 19 mounted on the entire surface of the continuous treads 15 so that the continuous treads 15 may be attracted to the inner wall surface of the piping 3. The continuous treads 15 which can move in sliding movement peripherally of the inner wall surface of the piping 3 enable the vehicle 1 to produce a traction force while being attracted to the inner wall surface of the piping 3 by the magnetic force of the magnets 19.

In the embodiment of the invention shown and described hereinabove, the continuous treads 15 are attracted to the inner wall surface of the piping 3 by the magnetic force of the magnets 19 and enable the vehicle 1 to produce a traction force. This enables the continuous treads 15 to be kept in contact with the inner wall surface of the piping 3 at all times by a simple mechanism. When the piping 3 has elbows or the inner wall surface of the piping 3 has different levels, the continuous treads 15 are prevented from separating themselves from the piping 3 by the magnetic force of the magnets 19 and enable the vehicle 1 to produce a frictional force.

Figure 10:
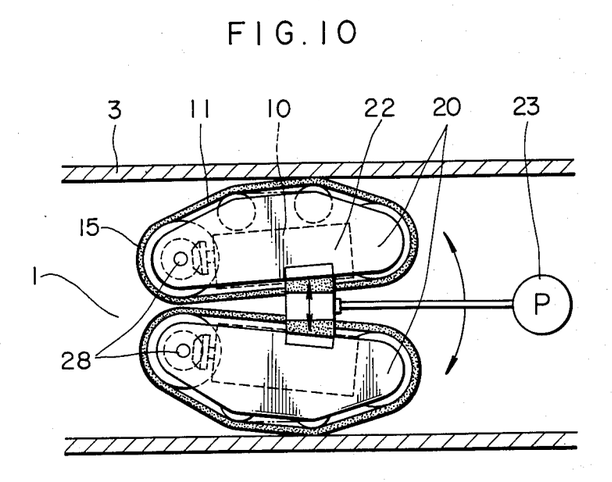
FIG. 10 is a sectional view of another modification of the embodiment shown in FIG. 4 which is equipped with another constructional form of continuous tread biasing means comprising resilient pressure vessels.

FIG. 10 shows another constructional form of continuous tread biasing means comprising resilient pressure vessels.

More specifically, the continuous tread biasing means comprises resilient pressure vessels 22 each for forcing one of the continuous treads 15 against the inner wall surface of the piping 3, and means 23 for allowing a working fluid, such as a liquid or a gas, to flow into and out of the resilient pressure vessels 22. The continuous treads 15 which are superposed one above the other are mounted to the frame 20 of the vehicle 1 and each supported for pivotal movement about a rotary shaft 28 located in a plane inside the respective continuous tread 15. As the working fluid is introduced into the resilient pressure vessels 22 through the fluid introducing means 23, the upper and lower continuous treads 15 are biased in the directions of arrows into contact with the inner wall surface of the piping 3.

In the embodiment of the invention shown and described hereinabove, it is possible to force the continuous treads 15 against the inner wall surface of the piping 3 with a force of desired magnitude. Thus the continuous treads 15 enable the vehicle 1 to produce a traction force of high magnitude even if there are different levels on the inner wall surface of the piping 3 along which it travels.

Figure 11:
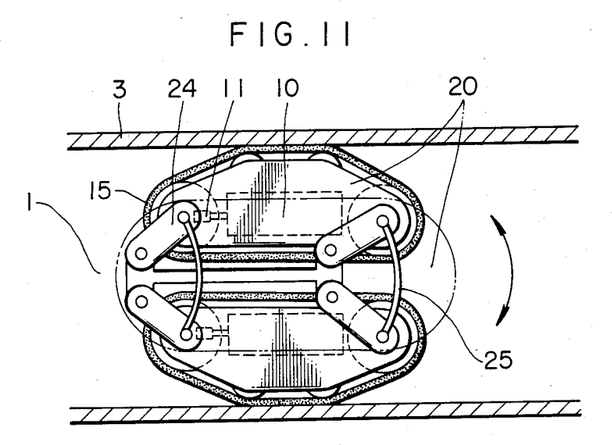
FIG. 11 is a sectional view of a further embodiment of the piping travelling apparatus in conformity with the invention, in which the continuous treads are each supported by parallel links pivoted at two points in a plane within the respective continuous treads.

FIG. 11 shows another embodiment of the invention in which the continuous treads 15 are mounted by parallel links pivotally supported at two points in a plane within the respective continuous treads 15.

More specifically, the continuous treads 15 shown in FIG. 11 are each supported by parallel links 24 pivoted at two points in a plane within the respective continuous treads 15. A plurality of plate springs 25 mounted between the two continuous treads 15 located in diametrically opposed positions force the continuous treads 15 against the inner wall surface of the piping 1 to enable the vehicle 1 to produce a necessary traction force.

Figure 12:
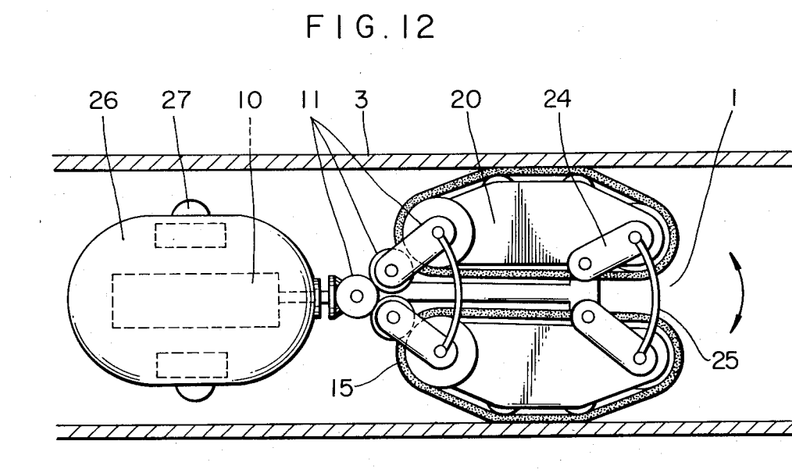
FIG. 12 is a front view of a modification of the embodiment shown in FIG. 11, in which drive motors for driving the continuous treads are supported separately from the continuous treads.

FIG. 12 shows a modification of the embodiment shown in FIG. 11 in which the drive motors 10 are supported separately in a drive motor frame 26. The vehicle 1 should have a small overall length and a small volume to smoothly move into a branch at a junction or negotiate the bend of an elbow without any trouble. Meanwhile it is necessary to increase the capacity of the drive motors 10 to increase the traction force produced by the vehicle 1 so that the vehicle 1 can smoothly travel through vertical or steeply slanted pipes. To this end, the drive motors 10 are supported in the drive motor frame 26 separately from the continuous tracks 15 and continuous track biasing means which are supported in the frame 20, and the drive motors connected to the continuous treads 15 through transmission gearing 11. Motive force is transmitted from the drive motors 10 to the continuous treads 15 through planetary gears of the transmission gearing 11 mounted to the parallel links 24. This arrangement enables motive force to be transmitted from the drive motors 10 to the continuous treads 15 which are kept in contact with the inner wall surface of the piping 3, thereby allowing the vehicle 1 to produce a necessary traction force.

From the foregoing description, it will be appreciated that the piping travelling apparatus comprising at least one vehicle for travelling back and forth in the piping which is equipped with a plurality of continuous treads spaced apart a predetermined distance peripherally of the inner wall surface of the piping offers many advantages. The vehicle can travel without any trouble even if the piping has branches or bends and the inner wall surface of the piping has different levels at pipe joints or rises and falls at many locations. Even if the piping is relatively small in diameter or it has vertical or slanted pipes, the vehicle can travel smoothly without any trouble.

What is claimed is:

1. A piping traveling apparatus, comprising:
a frame;
a plurality of continuous treads mounted for rotation on said frame so that at least a portion of each tread is disposed outside said frame to drive the frame as the treads rotate in contact with an inner wall surface of the piping;
drive means including at least one motor and transmission gearing coupled between said motor and said continuous treads for driving said treads in rotation;
continuous tread biasing means for forcing said plurality of continuous treads outwardly of said frame so as to be pressed into contact with the inner wall surface of the piping;
control means for remotely controlling said continuous tread biasing means so as to selectively vary the outward force applied to said continuous treads to vary the contact pressure between said continuous treads and the inner wall surface of the piping as said apparatus;
wherein said continuous tread biasing means comprises spring holder means mounted on said frame and means including at least one coil spring supported by said spring holder means for biasing said continuous treads, said coil spring being formed of a shape memory alloy, and wherein said control means comprises heating means for selectively heating said coil spring to control the biasing force thereof.

2. An apparatus according to claim 1, wherein pairs of continuous treads are mounted in opposing relationship for outward movement in opposite directions, and wherein said continuous tread biasing means is disposed between the treads of at least one pair so as to effect said outward movement thereof in a controlled manner under control of said control means.

3. A piping traveling apparatus, comprising:
a frame;
a plurality of continuous treads mounted for rotation on said frame so that at least a portion of each tread is disposed outside said frame to drive the frame as the treads rotate in contact with an inner wall surface of the piping;
drive means including at least one motor and transmission gearing coupled between said motor and said continuous treads for driving said treads in rotation; and continuous tread biasing means for forcing said plurality of continuous treads outwardly of said frame so as to be pressed into contact with the inner wall surface of the piping;

wherein pairs of continuous treads are mounted in opposing relationship for outward movement in opposite directions, and wherein said continuous tread biasing means is disposed between the treads of at least one pair of continuous treads, so as to effect said outward movement thereof in a controlled manner under control of a control means;

said continuous tread biasing means comprising a plurality of pairs of parallel links and a plurality of plate springs, each pair of said parallel links pivotally connecting each of the continuous treads with the frame for switching the tread in the tread rotating plane, and each pair of said plate springs connecting the diametrically opposed continuous treads of a pair with each other for forcing the treads against the inner wall surface of the piping, whereby the apparatus can travel back and forth through the piping with the continuous tread forced against the inner wall surface of the piping by means of said continuous tread biasing means.

* * * * *